(12) United States Patent
Saxena et al.

(10) Patent No.: US 8,823,284 B2
(45) Date of Patent: Sep. 2, 2014

(54) OPTIMAL POWER SUPPLY TOPOLOGIES FOR SWITCHED CURRENT-DRIVEN LEDS

(75) Inventors: Sunit K. Saxena, Bangalore (IN); Milan Rajne, Bangalore (IN); Sukumar De, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 244 days.

(21) Appl. No.: 13/294,105

(22) Filed: Nov. 10, 2011

(65) Prior Publication Data
US 2013/0119868 A1  May 16, 2013

(51) Int. Cl.
*H05B 37/02* (2006.01)
(52) U.S. Cl.
USPC ......... 315/307; 315/297; 315/122; 315/185 R
(58) Field of Classification Search
None
See application file for complete search history.

(56) References Cited

U.S. PATENT DOCUMENTS

| 2008/0224625 | A1 | 9/2008 | Greenfeld | |
| 2009/0230881 | A1 | 9/2009 | Chen et al. | |
| 2009/0315473 | A1 | 12/2009 | Tsai et al. | |
| 2010/0019697 | A1 | 1/2010 | Korsunsky et al. | |
| 2010/0045187 | A1* | 2/2010 | Shteynberg et al. | 315/149 |
| 2010/0259177 | A1* | 10/2010 | Mednik et al. | 315/185 R |

OTHER PUBLICATIONS

Maxim, High-Power LED Driver with Integrated High-Side LED Current Sense and PWM Dimming MOSFET Driver, MAX16834, 19-4235; Rev 3; 1/10.
National Semiconductor Corporation, DS201602; LM3519, High Frequency Boost White LED Driver with High-Speed PWM Brightness Control, Sep. 2005, 14 pages. www.national.com.
Garcia, et al., Interleaved Buck Converter for Fast PWM Dimming of Hight-Brighness LEDs, Dept. of Electrical Engineering, ce3i2 Research Group, University of Oviedo, Asturias, Spain, IEEE 2011.

\* cited by examiner

*Primary Examiner* — Jany Richardson
(74) *Attorney, Agent, or Firm* — Ingrassia Fisher & Lorenz, P.C.

(57) ABSTRACT

Optimal power supply topologies that do not use output bulk capacitors as well as freewheeling diodes in output section to therefore provide efficiency, cost, volume, and weight advantage over the existing solutions. The present invention applies a pulse-width modulated switched current at higher frequency (in order of 10 to 100 kHz) to LEDs without degrading optical performance. LEDs' average current control is attained using a feedback loop that senses the average value of LEDs' current and controls the current by varying the pulse width of applied current.

7 Claims, 6 Drawing Sheets

OPTIMAL POWER SUPPLY TOPOLOGIES FOR SWITCHED CURRENT-DRIVEN LEDS

BACKGROUND OF THE INVENTION

Recently light emitting diode (LED) based lighting solutions are gaining popularity over traditional light sources such as incandescent lamps, Fluorescent Lamp, Halogen lamps, and high intensity discharge (HID) lights. LED offers highly reliable and energy efficient lighting solutions. LED light output is controlled by forward current flowing through it, hence LED-based lighting solutions need current control electronic circuits. Cost, volume, weight and efficiency of electronics driver circuit's components play a major role in order to make LED lighting solutions successful for retrofit applications as well as new products developments.

The constant current sources for LEDs are derived using standard DC-DC converter topologies. These may include non-isolated DC-DC converters such as buck, boost, buck-boost, Sepic/cuk converters, or isolated topologies like fly back, forward converters etc. The control logic for these power supplies is modified in such a way to maintain constant LED current. This is achieved by sensing LED current and comparing it with a reference value. The list of these converters can be huge but all these solutions use free-wheeling diode(s) and a bulk capacitor in an output section. All these solutions suffer in terms of efficiency, cost, weight and volume because of the output filter capacitor and freewheeling diodes.

Some recent solution shows an optimized LED driver topology without an output bulk filter capacitor to reduce cost, weight and volume of LED drivers. Although this solution suffers in terms of efficiency, weight, cost and volume due to use of freewheeling diodes. Freewheeling diodes create switching and conduction losses which reduces efficiency and require bulkier heat-sinks for larger heat dissipation. In order to improve the efficiency and reduce heat-sink requirements, fast recovery and/or Schottky silicon carbide diodes are used; however this increases the cost of LED drivers.

SUMMARY OF THE INVENTION

Optimal power supply topologies are proposed that do not use output bulk capacitors as well as freewheeling diodes in output section to therefore provide efficiency, cost, volume, and weight advantage over the existing solutions. The present invention applies a pulse-width modulated switched current at higher frequency (in order of 10 to 100 kHz) to LEDs without degrading optical performance. LEDs' average current control is done using a feedback loop that senses the average value of LEDs' current and controls the current by varying the pulse width of applied current.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
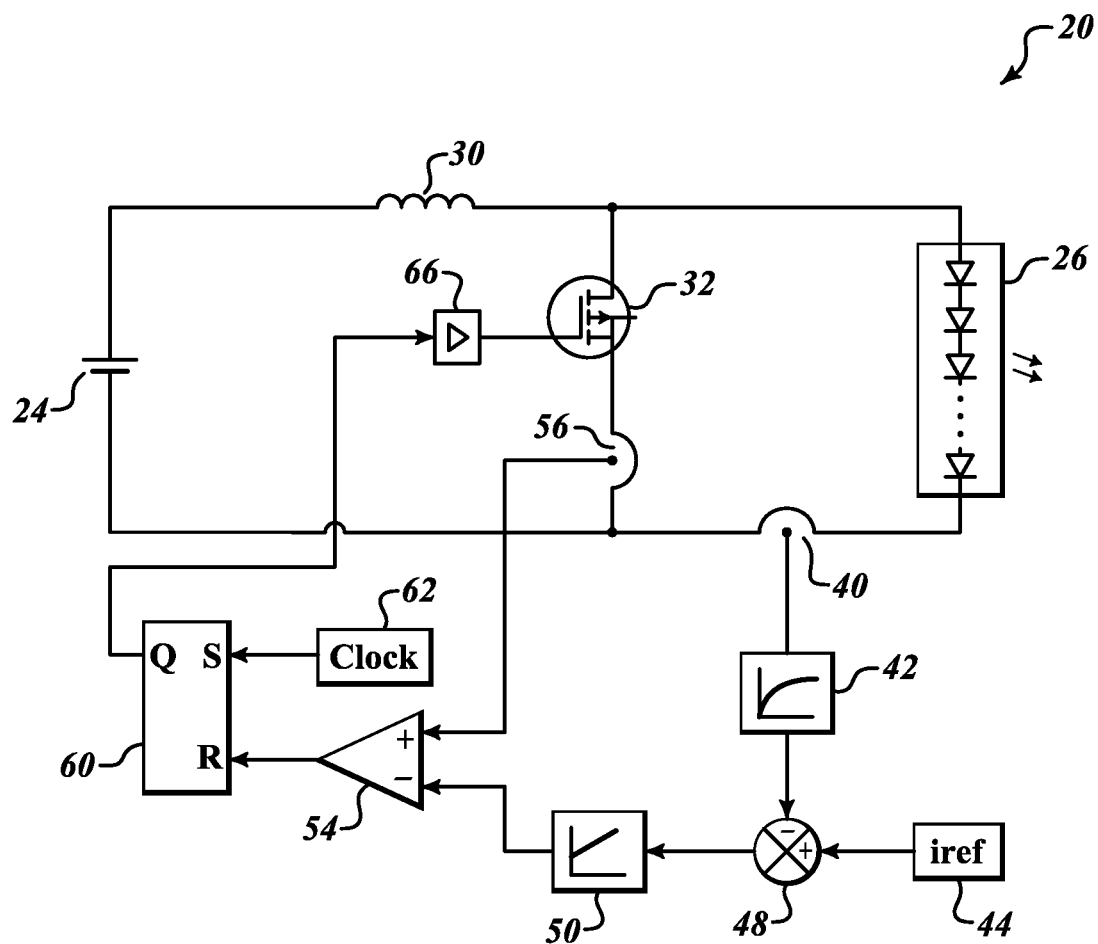
FIG. 1 is a schematic diagram of an exemplary circuit formed in accordance with an embodiment of the present invention.

FIG. 1 shows exemplary power and control circuit 20 according to an embodiment of present invention. The power and control circuit 20 includes a direct current (DC) voltage source 24, which supplies required power to drive sufficient current to an LED string 26 through a switching network formed by an input inductor 30 and an actively controlled power semiconductor switch 32. The LED string 26 includes any number of LEDs in series depending upon the application requirement. This topology is recommended for applications in which voltage requirements of the LED string are higher than the input voltage source 24. A first end of the inductor 30 is connected to the positive lead of the DC voltage source 24. A second end of the inductor 30 is connected to a drain (or source depending upon the type of switch) of the semiconductor switch 32 and an anode end of the LED string 26. The cathode end of the LED string 26 is connected to the source (or drain depending upon the type of switch) of the semiconductor switch 32 and the negative lead of the DC voltage source 24.

Those skilled in art may appreciate that there are wide varieties of controlled power semiconductor switches that may be used for this application, such as power transistors, MOSFET, IGBTs, GTOs, etc., which can be used as the power switch 32 in the switching network.

In a first mode of operation, when the semiconductor switch 32 is on, current is denied to the LED string 26. In this mode, current is increased through the inductor 30 storing energy.

In a second mode of operation, the switch 32 is turned off thereby causing the inductor 30 to discharge through the LED string 26. These modes repeat at a predefined frequency thereby providing a desired current to the LED string 26.

Figure 2:
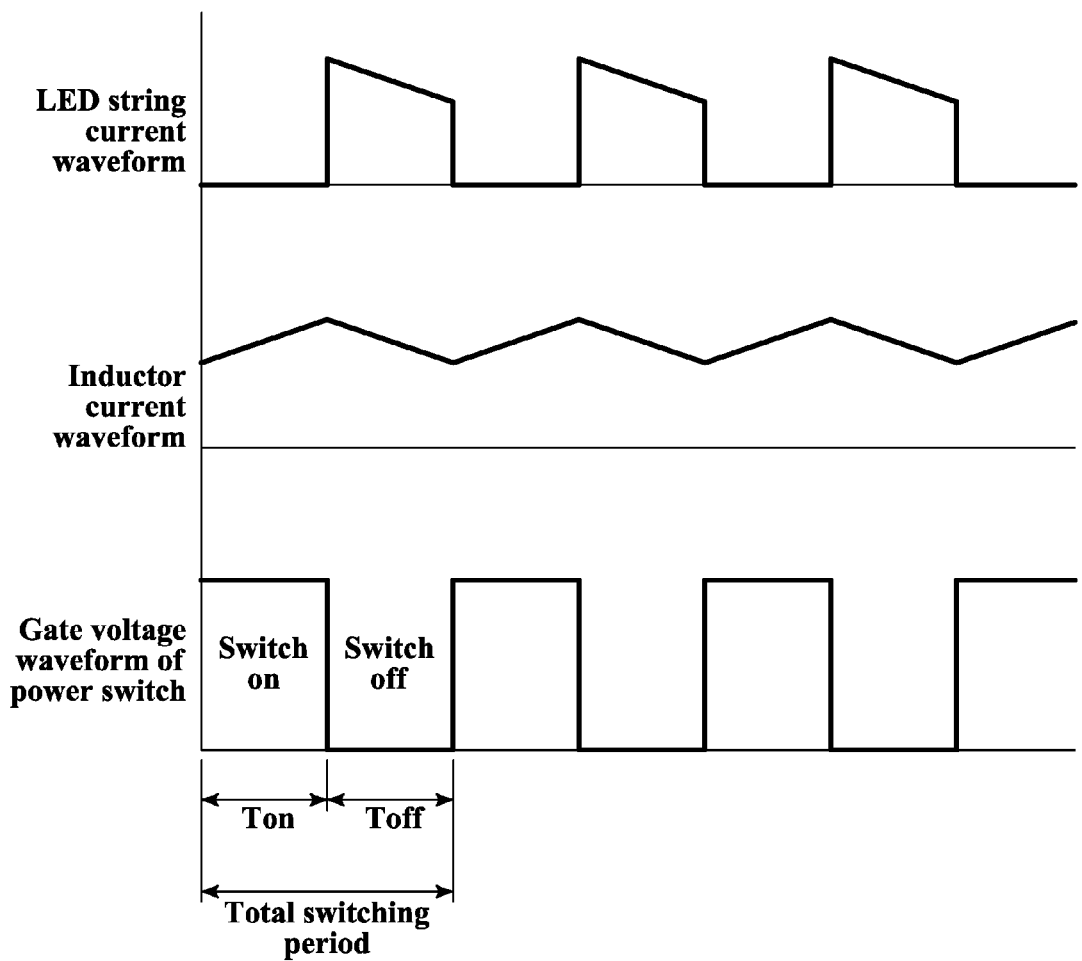
FIG. 2 shows waveforms of signals within the circuit shown in FIG. 1.

FIG. 2 shows the current waveform through the inductor 30, the current waveform through the LED string 26 and a control signal with appropriate turn-on and turn-off times that is provided to the semiconductor switch 32. The LED string current becomes equal to the inductor current during the off period of the switch 32 and remains zero during the on period of the switch 32. The average value of LED string current is proportional to switch on time therefore average LED string current control is possible by modulating switch on time at a given frequency. Switch on time modulation is referred to as switch duty cycle control where duty cycle is defined as ratio of switch on time with respect to total switching period.

In order to control the average value of LED string current accurately, a negative feedback system increases the switch duty cycle whenever a higher value of LED string current is desired and reduces the switch duty cycle whenever a lower value of LED string current is desired. A current sense signal is obtained from an LED current sensor 40. Then the sensed current is applied to a low pass filter 42 to get an average value. An input current reference (Iref) 44 is subtracted from the average value obtained from the low pass filter 42 at a combiner 48 to form part of the negative feedback control system. Iref 44 is the desired average value of the LED current. The subtraction error (i.e., output of the combiner 48) is fed to a proportional-integral-derivative (PID) controller 50, which provides a peak current reference for the switch current waveform. A comparator 54 compares a peak switch current sensed at the source (or drain depending upon the type of switch) of the switch 32 by a current sensor 56 to the peak current reference generated by the PID controller 50. The current sensor 56 senses the instantaneous value of switch current.

Thus when the sensed switch peak current becomes equal to the peak current reference, the comparator 54 gives a pulse to reset an R-S latch 60. When reset input of the R-S latch 60 goes high, the R-S latch 60 send a low/off signal to the gate of the switch 32 thus turning off the switch 32. Output of R-S latch 60 is set by an independent clock 62 to provide turn-on pulse for switch 32. Frequency of the clock 62 decides the switching frequency for the switch 32. A gate driver buffer circuit 66 amplifies the output of RS-latch 60.

Those who are skilled in art may appreciate that the components of the negative feedback control system mentioned above are readily available as commercial off the shelf (COTS) Integrated Circuit (IC) components, from various manufacturers such as Texas Instrument, Linear Technology, National Semiconductor, etc., generally referred to as current mode controller ICs.

Figure 3:
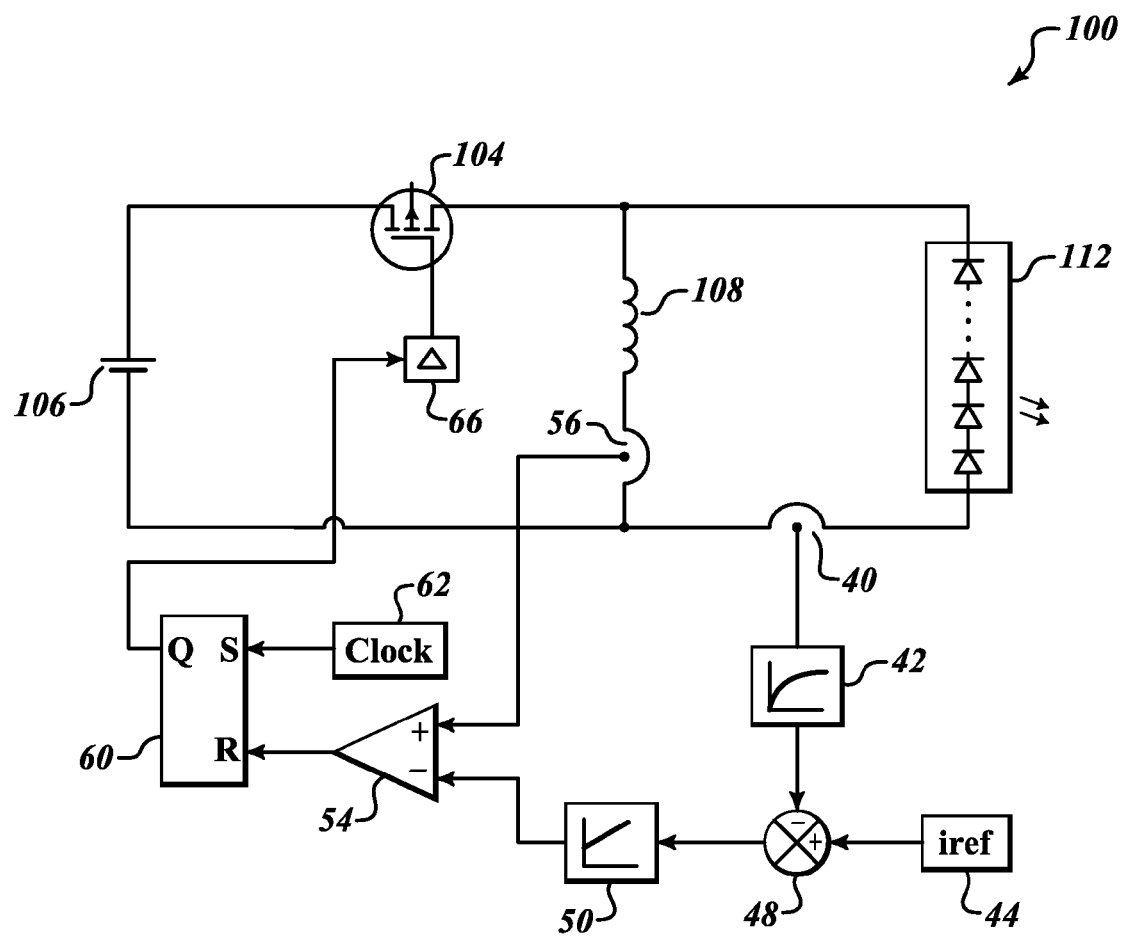
FIG. 3 is a schematic diagram of a second exemplary circuit formed in accordance with an embodiment of the present invention.

FIG. 3 shows a power circuit and control circuit 100 of another embodiment of the present invention. A drain (or source depending upon the type of switch) of a power semiconductor switch 104 is connected to the positive terminal of a DC power source 106. The source (or drain depending upon the type of switch) of the switch is connected to a first end of an inductor 108 and to a cathode of an LED string 112. The polarity of the LED string 112 is reversed as compared to the string 26 shown in FIG. 1. This circuit 100 can be used for applications in which the LED string 112 requires voltage magnitude that is either lower or higher than supplied by the input voltage source 106.

A feedback control system of the circuit 100 is identical to the feedback control system of the circuit 20 except the LED current sensor 40 is connected to the anode of the LED string 112 and the current sensor 56 is connected to the second end of the inductor 108. Those skilled in art would appreciate that there exist different type of control methodologies other than explained previously. Some of the control methodologies are mentioned below:

Constant frequency discontinuous conduction peak current mode control. This is another type of current mode control wherein the inductor current drops down to zero value before the next switching cycle starts;
Constant frequency continuous/discontinuous conduction voltage mode control;
Variable frequency constant ON time/constant OFF time voltage/current mode control; and
Variable frequency Hysteresis current mode control.

Figure 4:
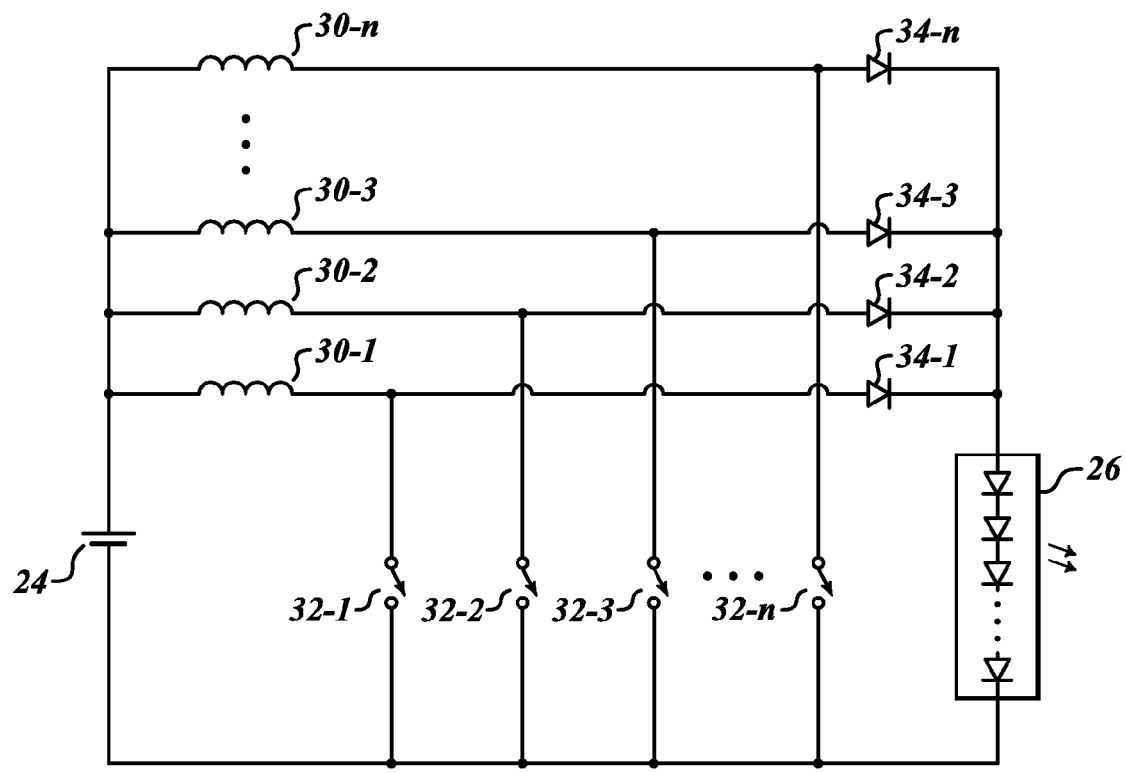
FIGS. 4 and 5 show interleaved circuits that correspond to the circuits shown in FIGS. 1 and 2, respectively.
Figure 5:
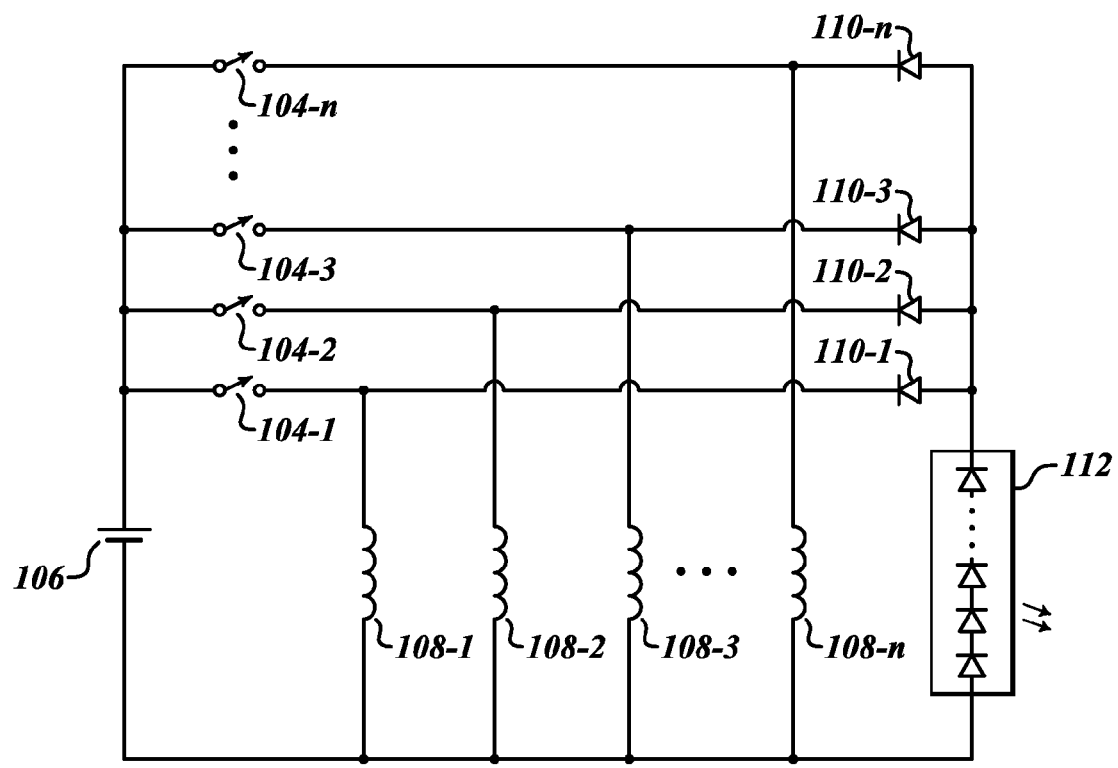

FIGS. 4 and 5 show interleaved versions of first and second embodiments of FIGS. 1 and 2 respectively, applying a pulse-width modulated current to the LED string 26. Interleaved variants gives a major benefit of smoothening the LED string current. If there are "N" interleaved circuits then, LED current frequency will be "N" times the individual circuit switching frequency.

In absence of a diode, the moment a switch is turned ON, current in all inductors of the circuit will start ramping up via this turned ON switch. The diodes 34, 110 ensure the ramping of current in only one inductor 30, 108 at a time. Without the diode the interleaved operation will not work.

Figure 6:
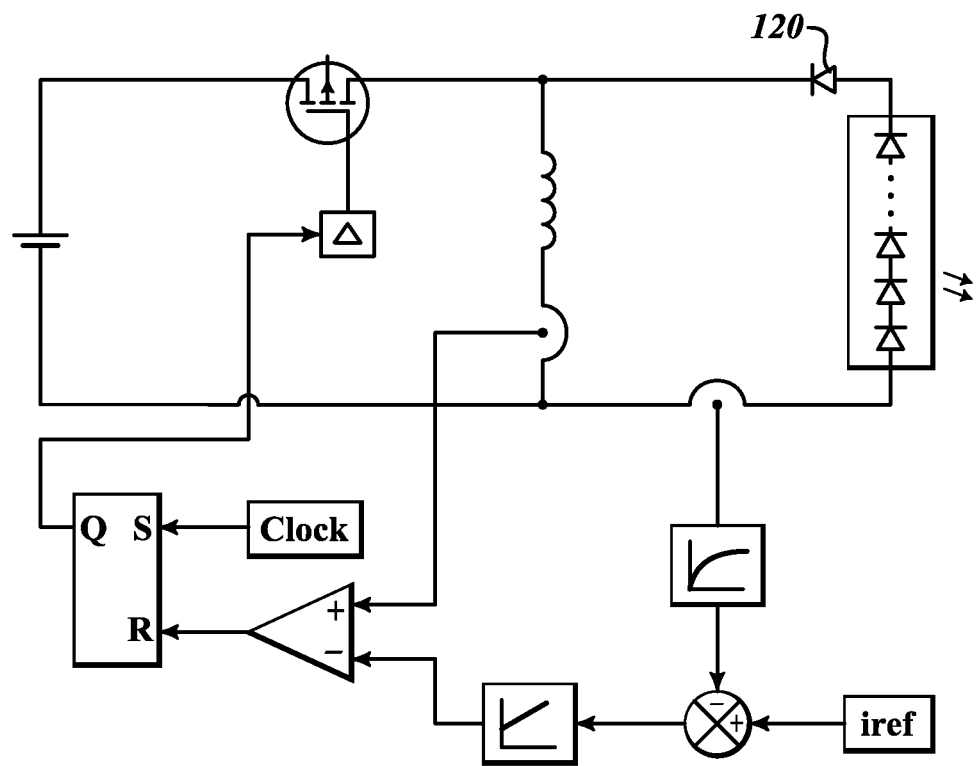
FIG. 6 is a schematic diagram of another exemplary circuit similar to the circuit shown in FIG. 3.

FIG. 6 shows a circuit that is a slight variation of the circuit 100 shown in FIG. 3. The circuit of FIG. 6 includes a diode 120 located between the LED string 112 and the switch 104. The diode 120 provides reverse blocking capabilities.

The circuit 100 shown in FIG. 3 can be used for applications in which LED string required voltage magnitude is either lower or higher than input voltage source provided LEDs with appropriate reverse blocking capabilities are available. The circuit 100 works as—is for the applications in which LED string required voltage magnitude is higher than input voltage source. For the operation of circuit 100 in which input voltage is higher than the reverse blocking capability of LED string, the additional diode 120 with appropriate reverse blocking capability will ensure the safe operation of circuit 100.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A LED driver circuit comprising:
    a string of one or more light emitting diodes (LEDs), each of the one or more LEDs having a cathode and an anode;
    a power source having a positive terminal and a negative terminal;
    a switch having a first port, a second port, and a gate, the first port of the switch connected to the positive terminal of the power source;
    an inductor having a first end and a second end, the first end connected to the second port of the switch and to a cathode of the LED string, the second end connected to an anode of the LED string and the negative terminal of the power source; and
    a controller connected to the gate and configured to:
        sense a first current through the LED string and a second current through at least one of the switch or the inductor; and
        deactivate the switch based on a predefined relationship between the first and second currents and a predefined reference current.

2. The circuit of claim 1, wherein the controller deactivates the switch when the second current is within a threshold from the difference between the first current and the predefined reference current.

3. The circuit of claim 2, further comprising a clock configured to generate a clock signal, wherein the controller activates the switch when the clock signal is activated.

4. The circuit of claim 1, wherein the inductor is connected between a positive terminal of the power source, a first port of the switch and an anode of the LED string, a gate of the switch is connected to the controller, and a second port of the switch is connected to a negative terminal of the power source and a cathode of the LED string.

5. The circuit of claim 1, wherein the switch comprises a semiconductor switch.

6. A control circuit comprising:
    a string of one or more light emitting diodes (LEDs);
    a power source; and
    a plurality of control subcircuits comprising:
        a switch;
        an inductor;
        a controller configured to:
            sense a first current through the LED string and a second current through at least one of the switch or the inductor; and
            deactivate the switch based on a predefined relationship between the first and second currents and a predefined reference current; and a diode located between the switch and the inductor and the string of LEDs, wherein the diodes are activated in order to control inductor operation.

7. A LED driver circuit comprising:

a string of one or more light emitting diodes (LEDs), each of the one or more LEDs having a cathode and an anode;

a power source having a positive terminal and a negative terminal;

a switch having a first port, a second port, and a gate, the first port of the switch connected to the positive terminal of the power source;

a diode connected between the second port of the switch and the LED string, such that an anode of this diode is connected to a cathode of LED string;

an inductor having a first end and a second end, the first end connected to the second port of the switch and to a cathode of the diode, the second end connected to an anode of the LED string and the negative terminal of the power source; and a controller connected to the gate and configured to:
  sense a first current through the LED string and a second current through at least one of the switch or the inductor; and
  deactivate the switch based on a predefined relationship between the first and second currents and a predefined reference current.

* * * * *